United States Patent [19]

Juptner et al.

[11] E Patent Number: Re. 33,479

[45] Reissued Date of Patent: Dec. 11, 1990

[54] VIBRATORY ANGULAR RATE SENSING SYSTEM

[75] Inventors: William F. Juptner, Laguna Beach; David F. Macy, Mission Viejo; Juergen H. Staudte, Anaheim, all of Calif.

[73] Assignee: Piezoelectric Technology Investors, Laguna Hills, Calif.

[21] Appl. No.: 147,621

[22] Filed: Jan. 22, 1988

Related U.S. Patent Documents

Reissue of:

[64] Patent No.: 4,538,461
Issued: Sep. 3, 1985
Appl. No.: 572,782
Filed: Jan. 23, 1984

U.S. Applications:

[63] Continuation of Ser. No. 859,474, May 2, 1986, abandoned.

[51] Int. Cl.[5] ..... G01P 9/04

[52] U.S. Cl. ..... 73/505; 310/329

[58] Field of Search ..... 73/505; 310/329, 333, 310/370

[56] References Cited

U.S. PATENT DOCUMENTS

| | | | |
|---|---|---|---|
| 2,455,939 | 12/1948 | Meredith | 73/505 |
| 2,513,340 | 7/1950 | Lyman | 73/505 |
| 2,544,646 | 3/1951 | Barnaby et al. | 73/505 |
| 2,753,173 | 7/1956 | Barnaby et al. | 73/505 |
| 3,127,775 | 4/1964 | Hansen . | |
| 3,141,100 | 7/1964 | Hart . | |
| 3,143,889 | 8/1964 | Simmons et al. . | |
| 3,241,377 | 3/1966 | Newton | 73/505 |
| 3,251,231 | 5/1966 | Hunt et al. | 73/505 |
| 3,258,617 | 6/1966 | Hart . | |
| 3,269,192 | 8/1966 | Southworth et al. . | |
| 3,307,409 | 3/1967 | Newton, Jr. . | |
| 3,319,472 | 5/1967 | Reefman . | |
| 3,465,597 | 9/1969 | Riordan . | |
| 3,520,195 | 7/1970 | Tehon . | |
| 3,839,915 | 10/1974 | Schlitt . | |
| 4,429,248 | 1/1984 | Chuang . | |

FOREIGN PATENT DOCUMENTS

| | | | |
|---|---|---|---|
| 84704 | 8/1983 | European Pat. Off. | 73/505 |
| 1269398 | 5/1968 | Fed. Rep. of Germany | 73/505 |
| 2845008 | 4/1980 | Fed. Rep. of Germany . | |
| 611011 | 10/1948 | United Kingdom | 73/505 |
| 861436 | 2/1961 | United Kingdom | 73/505 |
| 947310 | 1/1964 | United Kingdom | 73/505 |

OTHER PUBLICATIONS

R. E. Barnaby, et al., "General Theory and Operational Characteristics of the Gyrotron Angular Rate Tachom-

*Primary Examiner*—John Chapman
*Attorney, Agent, or Firm*—Flehr, Hohbach, Test, Albritton & Herbert

[57] ABSTRACT

[A vibratory angular rate sensing system may have one pair of tines forming an angle of about 60 degrees, resulting from the crystalline orientation of the Z-cut quartz wafer of the system. In one configuration each of the tines is provided with a mass offset from the axis of the associated tine, a pivot extends through the plane of symmery of the tines and may be connected to a dummy reaction mass. The resonant system is suspended from a mounting frame by a pair of suspension bridges. A second embodiment of the invention features two groups of tines, each group including two pairs of tines arranged in the form of a cross. Again, an offset mass is associated with the free end of each tine and each group of tines is secured to its frame by a suspension bridge.]

*Vibratory angular rate sensing system having a support structure and a driven fork lying in a plane and having an axis of symmetry. The fork has first and second spaced apart tines. A mouting is provided for mounting said fork on said support structure. Energy is coupled into the driven fork to cause vibratory motion of the tines of the driven fork in the plane of the driven fork. A torsionally resonant member is coupled to the fork. A pickoff is provided which is isolated from the support structure for sensing motion of the torsionally resonant member to provide a measure of the input angular rate about the axis of symmetry of the driven fork.*

21 Claims, 2 Drawing Sheets

(List continued on next page.)

OTHER PUBLICATIONS eter", Nov. 1953, pp. 31–36, Acoust. Eng. Review.
J. L. Lyman, "A New Space Rate Sensing Instrument", Nov. 1953, pp. 21–30, Acout. Engineering Review.
C. T. Morrow, "Zero Signals in the Sperry Tuning Fork Gyrotron", May 1955, pp. 581–585, Journal of Acoustical Society of America.
G. C. Newton, "Comparison of Vibratory and Rotating Wheel Gyroscopic Rate Indicators", Jul. 1960, pp. 143–150, Part II, Transactions of the American Institute of Electronics Engineers, (AIEE).
G. C. Newton, "Theory and Practice in Vibratory Rate Gyros", Jun. 1963, pp. 95–99, Control Engineering.

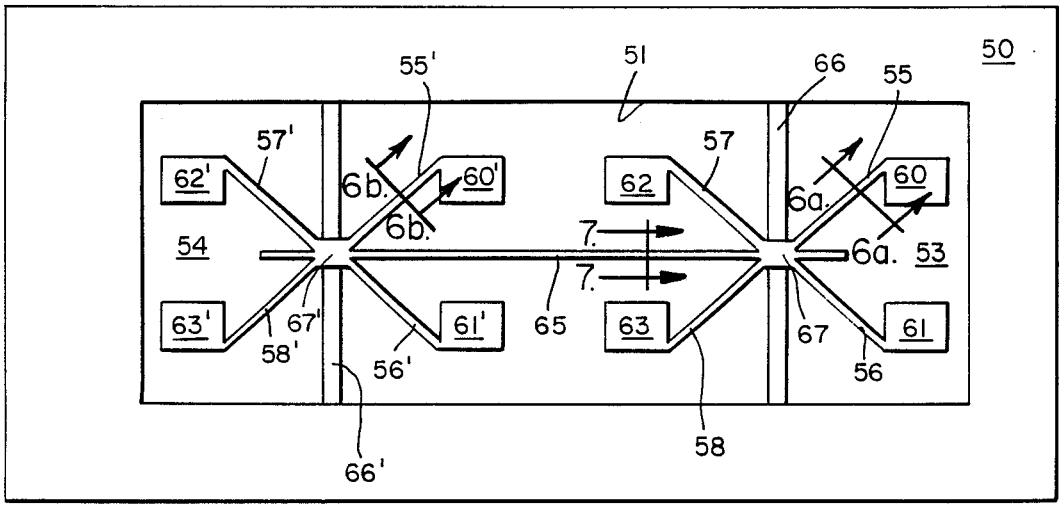
Fig. 5.
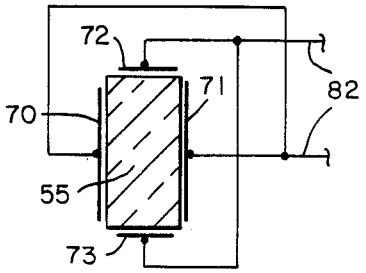
Fig. 6a.
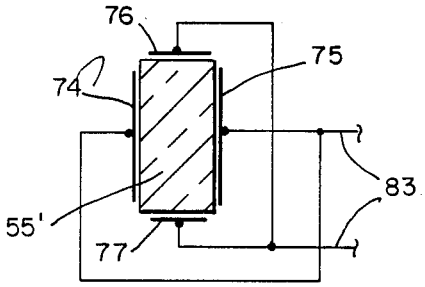
Fig. 6b.
Fig. 6c.
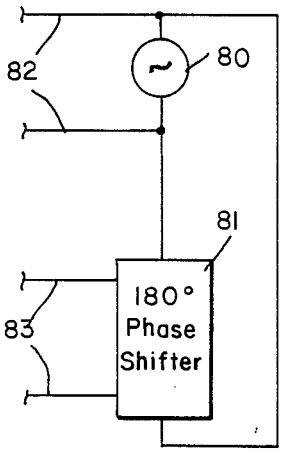
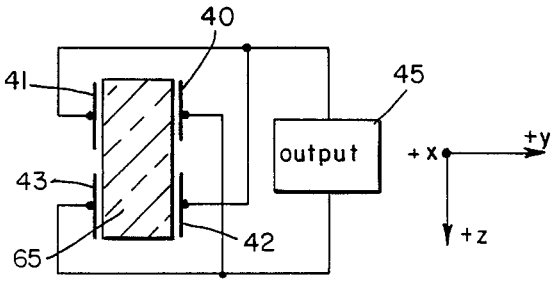
Fig. 7.

VIBRATORY ANGULAR RATE SENSING SYSTEM

Matter enclosed in heavy brackets [ ] appears in the original patent but forms no part of this reissue specification; matter printed in italics indicates the additions made by reissue.

*This is a continuation of application Ser. No. 859,474 filed May 2, 1986, abandoned.*

CROSS-REFERENCES TO RELATED APPLICATIONS

The present application may be considered to be an improvement and an extension of the principles of some of the present applicants' prior application entitled, "Angular Rate Sensor System," to Alsenz, et al., Ser. No. 06/321,964, filed Nov. 16, 1981. The present application is assigned to the same assignee as is the prior copending application.

The present application is also related to a copending application entitled, "Vibratory Angular Rate Sensor System," to Staudte, Ser. No. 06/572,783, which is also assigned to the same assignee as is the present application. The Staudte application has been filed concurrently with the present application and may be considered to be a different embodiment for the same purposes; that is, for minimizing undesired vibrations which may cause undesired noise.

BACKGROUND OF THE INVENTION

The angular rate of motion of a craft is an essential input for all navigational and inertial guidance systems. Such systems are used conventionally for aircraft, spacecraft, ships, or missiles. The sensing of the angular rate of motion is presently accomplished by means of a gyroscope.

Gyroscopes, however, have various disadvantages. They must be built to extremely high accuracies and may have drift rates of fractions of a degree per hour. Due to the expense of building them, they are very costly; they are physically large and heavy. They must be frequently and precisely maintained, for the reason that critical movable elements, such as bearings, may change with time. They may also be damaged by even low levels of shock and vibration. This, in turn, may cause an increase of unknown size in the drift rate, occurring at unknown times.

Because gyroscopes are sensitive to the effects of shock and vibration, they frequently have heavy mounting configurations to protect them, which also are expensive.

SUMMARY OF THE INVENTION

It will, accordingly, be obvious that it is desirable to replace a gyroscope by some other device which is less expensive and which is capable of measuring angular rates, thereby measuring the attitude of a vehicle or craft. In accordance with the present invention, this is accomplished by a balanced resonant sensor. Such a sensor is represented, in accordance with the present invention, by a tuning fork. The tuning fork should be substantially mechanically temperature-stable, have low internal friction, and follow Hook's Law. According to Hook's Law, the strain of an elastic body is proportional to the stress to which the body is subjected by the applied load (the strain, however, must be within the elastic limit of the body), and the body will return to its original shape when the stress is removed.

Preferably, but not necessarily, the tuning fork consists of quartz. However, other piezoelectric materials may be used, such as synthetic crystals; for example, ethylene diamine tartrate (EDT), dipotassium tartrate (DKT) or ammonium dihydrogen phosphate (ADP). Non-piezoelectric materials may be used within an electromagnetic drive.

According to the present invention, the angular rate sensing system of the invention is carved from a plate of Z-cut quartz, quartz being the preferred material. Since the plate has to be chemically etched or otherwise cut, for example by a laser beam or similar techniques, the orientation of the wafer is important, because etching along the Z-axis (that is, along the thickness of the wafer) is considerably faster and easier. Since a Z-cut quartz wafer has trigonal symmetry, the angle between, for example, a plus X and the next adjacent minus X direction is 60 degrees, the tines are oriented at such an angle of 60 degrees. In other words, the crystalline orientation permits a three-fold redundant choice of axis.

The structure consists basically of a frame within which is suspended, by two suspension bridges, a pair of tines, preferably at a 60 degree angle to each other. A pivot extends through the symmetry axis of the tines and is secured to what may be called a dummy reaction mass. A separate mass is secured to the free end of each tine but is offset from the axes of the tines.

The tines are vibrated, for example, electrically through electrodes driven by a drive oscillator substantially at the resonant frequency of the system, which is determined by the reaction mass, the two masses, the times, and the base of the tines. When the entire sensor is rotated in inertial space about the axis of symmetry, the masses, due to their motion relative to the rotation, will experience a force at right angles to their motion, in accordance with the Coriolis effect. The Coriolis force on the masses is such as to produce a torque on the sensor. This output torque strains a torsion member having electrodes disposed to pick up the piezoelectric charge created by the strain. The electrodes may, for example, consist of a thin gold film which has been vapor-deposited and may then be photolithographically etched through a suitable mask.

A second structure is also disclosed which includes two groups of tines, each group consisting of two pairs of tines disposed substantially in the shape of an X. One group of tines is driven in phase opposite to the other.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 5 is a plan view of another preferred modification of the invention, comprising two groups of two pairs of tines each;

FIG. 6a is a cross-sectional view taken along lines 6a—6a of FIG. 5 through one of the tines of one pair of the first group of tines and showing two pairs of electrodes disposed thereon;

FIG. 6b is a cross-sectional view taken along lines 6b—6b of FIG. 5 of a tine of a pair of tines of the second group, to show the four drive electrodes for a pair of the second group of tines;

FIG. 6c is a schematic circuit diagram showing how the first set of four electrodes is driven in phase opposition to the second sets of drive electrodes of the second group of tines; and FIG. 7 is a cross-sectional view taken along lines 7—7 of FIG. 5 showing two pairs of electrodes for obtaining the output signal and an output circuit connected thereto.

DESCRIPTION OF THE PREFERRED EMBODIMENTS

Figures 1, 2, 3, 4:
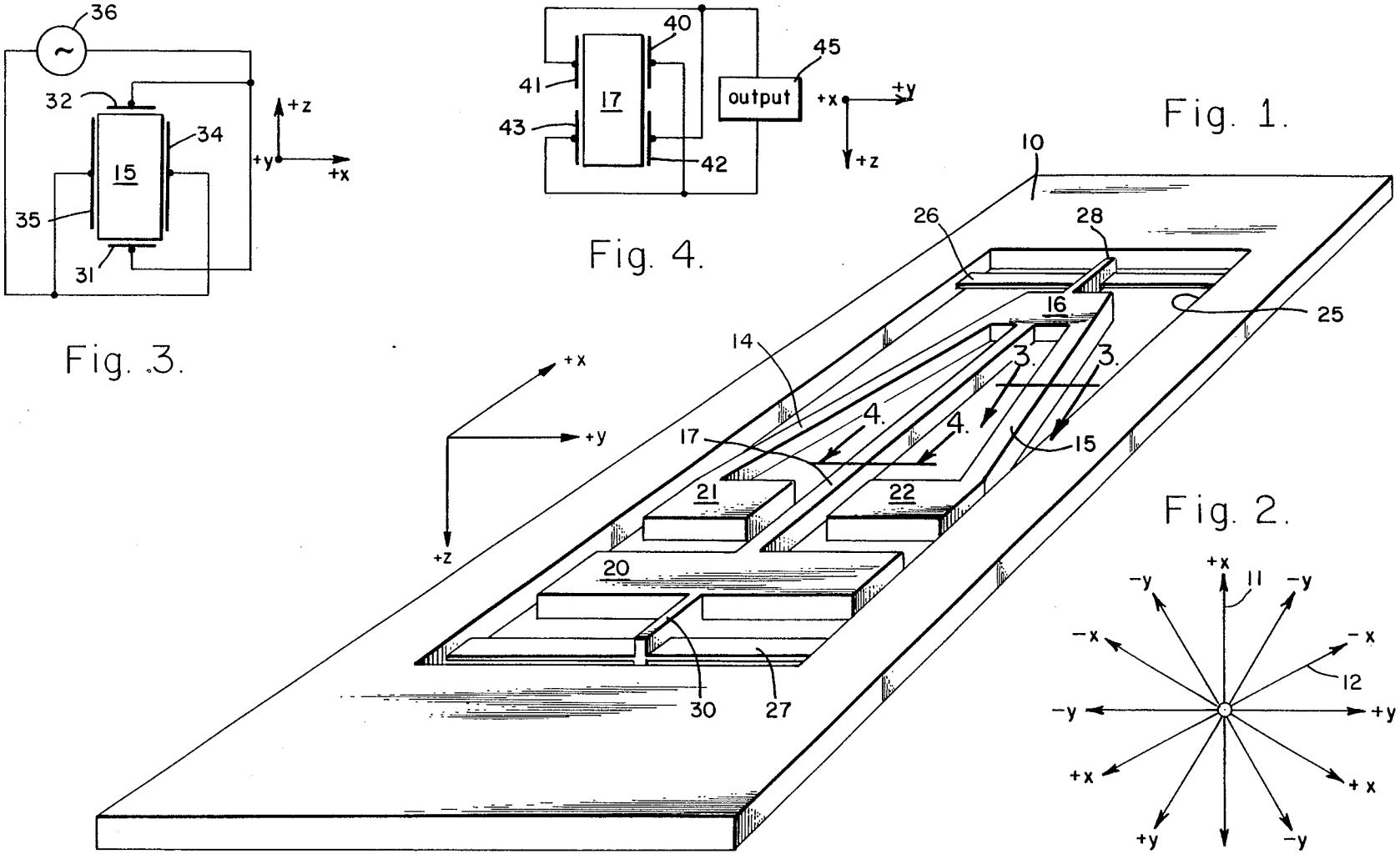
FIG. 1 is an isometric view of one configuration of the vibratory sensing system of the invention, including one pair of tines, the wafer orientation being shown adjacent to the structure.
FIG. 2 is a schematic picture of the quartz crystalline orientation.
FIG. 3 is a cross-sectional view taken on lines 3—3 of one of the tines to show the position of the drive electrodes and a drive oscillator with the wafer orientation shown with respect to the section.
FIG. 4 is a similar cross-sectional view taken on lines 4—4 of the pivot of the system, showing two pairs of output electrodes connected to an output circuit, the crystal orientation also being shown adjacent to FIG. 4.

Referring now to the drawings and particularly to FIGS. 1 through 4, there is illustrated a first embodiment of the present invention. The embodiment includes a mounting frame 10 which preferably consists of a Z-cut wafer of quartz. The wafer orientation has been shown adjacent to the frame 10 with the +X, +Y, and +Z directions. FIG. 2 illustrates the trigonal symmetry of the quartz crystal. It will be evident that the +X direction shown at 11 and the next adjacent −X direction 12 form an angle of 60 degrees with each other, etc. Accordingly, the two tines 14 and 15 of the system are disposed substantially at an angle of 60 degrees, starting from their base 16.

There is also provided a pivot 17 which extends along the symmetry axis between the two tines 14 and 15. One end of the pivot 17 is secured to what may be called a dummy reaction mass 20. Furthermore, a mass 21 is secured to the tine 14 at an offset angle with respect to the axis of the tine 14. A like mass 22 is similarly connected to the other tine 15.

The entire system, including the tines 14, 15, the base 16, the masses 21, 22, the pivot 17, and the dummy mass 20 are disposed within an opening 25 of the frame 10. Furthermore, this system is secured to the frame 25 by a pair of suspension or support bridges 26 and 27. There are further provided pivot support or bridge extensions 28 and 30 which connect the system to the two suspension bridges 26 and 27.

It will be understood that the two suspension bridges 26 and 27 are the only means supporting and securing the resonant system to the frame 10.

By way of example, the short side of the rectangular frame 10 may have a length of 0.400 inch, and the long side may have a length of 0.575 inch, the wafer having a thickness of 0.020 inch. Of course, these dimensions may change according to practical requirements, or the properties of the materials used.

The resonant system is driven by a first set of two drive electrodes 31 and 32 and a second set of drive electrodes 34 and 35, as shown in FIG. 3. The electrodes 31, 32 and 34, 35 are connected to each other and across a drive oscillator 36. It will be understood that both drive tines 14 and 15 are excited as illustrated in FIG. 3.

As shown by the adjacent wafer orientation, the electrodes 34, 35 are disposed along the Z-axis and the electrodes 31, 32 are arranged along the X-axis. The frequency of the drive oscillator 36 should be approximately that of the resonant system including the reaction mass 20, the masses 22, the tines 14, 15 and the base 16.

The output signal is obtained from the pivot 17, again by means of two pairs of electrodes as shown in FIG. 4. There is provided a first pair of electrodes 40, 41, and a second pair of electrodes 42, 43. Both pairs of electrodes are arranged along the Z-axis, as shown by the cross-section of FIG. 1. Electrodes 41 and 42 are connected together, while electrodes 40 and 43 are connected together and across an output circuit 45. The output circuit may be entirely conventional, to derive a signal representative of the input force.

The system responds only to rotation in the input plane and not to other rotations or to linear acceleration such as caused by gravity. On the other hand, the system requires an extremely precise mass balance.

It should be noted that the voltage-strain relationship varies with the orientation of the surface relative to the geometric axis system, as shown in FIGS. 1 and 2. A balance of the system is achieved by designing the structure in approximately the shape of a tuning fork. Also, a portion of the surface of the structure of FIG. 1 may be covered with a gold film which may be removed partially by a laser, or by etching, to obtain complete mass balance. This will provide an inherent geometric drive balance and a reaction inertia to the output torque which substantially avoids transferring energy to the mounting frame. This, of course, makes the system more efficient and also immune to environmental influence.

The system resonates at a frequency which is related to the inertia of the masses of tines and the stiffness of the tines. Because quartz inherently has a piezoelectric effect, electrical excitation of the system electrodes results in a strain of the tines.

It should be noted that the polarities of the electrodes, as shown in FIG. 3, are such that the tines resonate in mechanical opposition. In other words, the ends of the tines at one time approach each other and in some instant later move away from each other.

Furthermore, since the stiffness of the tines in the perpendicular or Z direction is much higher than that in the X or Y direction, the structure resonates only within the plane of the tines; that is, in the X-Y plane.

The system operates as follows: A constant rotation rate in inertial space about the input axis produces a Coriolis torque couple, attempting to rotate the structure in phase with the mass-drive velocity. The input axis may be defined by the intersection of the plane of the tines and the plane of symmetry of the tines. In other words, it may be considered to pass through the center of the pivot 17. The torque is transmitted to the pivot 17.

The torsional stiffness of the pivot and the rotational inertia of the mass and the tines about the input axis provide a rotational resonant system. The drive frequency is established at or near the resonant frequency of the system.

The pivot strain resulting from the Coriolis torque is enhanced by a factor as much as the Q of the pivot system.

The output electrodes 40 to 43 disposed on the pivot 17 pick up a reciprocating charge of amplitude proportional to the torsional strain. This, in turn, is proportional to the Coriolis torque, which, finally, is proportional to the input inertial rotation rate.

As explained hereinabove, the drive tines 14 and 15 are not disposed parallel to each other, but form an angle of approximately 60 degrees. This enhances the piezoelectric coupling of the drive electrodes. The inherent axial thrust at the fundamental drive frequency can cause large fundamental and small harmonic thrust components, which can cause energy loss to the mounting frame 10. However, since the masses 21, 22 move in arcs controlled by an appropriate offset thereof from the time axes, the fundamental thrust component is substantially cancelled.

This energy loss can be further minimized by the configuration of FIG. 5, where identical pairs of tines are disposed mechanically and driven in phase electrically, so that all thrust components are substantially cancelled. On the other hand, in the configuration of FIG. 1 the masses 21 and 22 form part of the tines 14, 15, to cancel only the first order thrust component.

Referring now to the second embodiment of the present invention illustrated in FIG. 5, there is again provided a mounting frame 50 of rectangular outline, having a rectangular opening 51 within which the vibrating system is disposed. The vibrating system includes a first group of two pairs of tines 53 and a second group of vibrating tines 54. The first group 53 has a first pair of tines 55, 56 and a second pair of tines 57, 58. The two pairs of tines 55, 56 and 57, 58 each form, again, an angle of about 60 degrees, with the two pairs of tines having approximately the configuration of an X. Offset masses 60, 61 are associated in an offset direction with the two tines 55, 56 similar to the masses 21, 22 of FIG. 1, and similarly offset masses 62, 63 are secured, respectively, to the tines 57, 58. A pivot 65 extends through the axis of symmetry of the first group of tines 53.

The second group of tines 54 is identical to that of the first group of tines, and corresponding elements have been designated with the same reference numbers, primed, as the first group of tines.

It will be noted that the system of FIG. 5 does not require a reaction mass, as does that of FIG. 1. The crystalline orientation is the same as that of the system of FIG. 1.

The first group of tines 53 is made integral with the frame 50 by a suspension bridge 66, while 66' designates the respective suspension bridge for the second group of tines 54. The two suspension bridges 66 and 66' pass through the center point 67 or 67' of each two pairs of tines.

The structure of FIG. 5 may have a width of 0.500 inch in the Y direction, a length of 1.080 inch in the X direction, and a thickness in the Z direction of 0.020 inch.

Referring now to FIGS. 6a and 6b, there are illustrated the drive electrodes for each group of tines 53 and 54 (shown in FIG. 5). In order not to confuse the drawings only one tine 55 and 55' of each group is illustrated in FIGS. 6a and 6b.

The tines 55, 56 and masses 60, 61 are driven in the same manner as the tines 57, 58 and masses 62, 63. To this end, a pair of electrodes 70, 71 and 72, 73 is provided on each of the tines. The electrodes 70, 71 are connected together, as are the other electrodes 72, 73, to form output leads 82.

Similarly, as shown in FIG. 6b, another pair of electrodes 74, 75 and a last pair of electrodes 76, 77 are disposed on the tines 55', 56', and 57', 58', each pair of electrodes being connected together as shown and having output leads 83. As shown in FIG. 6c, a drive oscillator 80 has its terminals connected by leads 82 across the first two pairs of electrodes 70, 71 and 72, 73, and by leads 83 across the second two pairs of electrodes 74, 75 and 76, 77 opposite in phase to the first pairs. As a result, the tines of the group 54 are driven in phase opposition to the tines of group 53.

Equal but opposite Coriolis torques are generated by the two tine groups, so that the torsion on the pivot 65 is balanced. The net result is that no net force is felt by the mounting frame 50.

The output signal is picked up from the pivot 65 by the electrodes illustrated in FIG. 7 in a manner similar to that shown in connection with FIG. 3.

It should be especially noted that the support bridges 26 and 27 of FIG. 1 and the bridges 66 and 66' of FIG. 5 have a flexural and torsional stiffness which is small compared to that of the respective pivot 17 and tines 14, 15, or the pivot 65 and tines 55, 56 and 57, 58 and the corresponding tines of group 54. Furthermore, the support masses are so small that the flexural resonant frequency is substantially the same as the drive and torsion frequency. As a result, the supports such as 26, 27 and 66, 66' present a resonant load on the rotational motions of the sensor which is even less than the static stiffness by a factor of the Q of the support resonance. This, of course, results in a high isolation of the sensor from the outside environment, which is very desirable.

What is claimed is:

1. A vibratory angular rate sensing system comprising:

(a) a wafer of crystalline quartz having piezoelectric properties and forming a [substantially rectangular] mounting [frame and having a substantially rectangular central opening];

(b) a *fork having a* pair of tines extending at a predetermined acute angle [within said opening] *from an origin and having an axis of symmetry*;

(c) *and* a base interconnecting said tines near their origin;

(d) [a first and a second suspension bridge, each being secured at its ends to] *bridge means supporting said fork on* said mounting [frame];

(e) a [pivot] *torsion member* extending [between] *along* the axis of symmetry of said [tines] *fork* and through said base[, said pivot] *and* being secured [near both ends by said suspension bridges] *to said bridge means for forming bridges*;

(f) a reaction mass secured to said [pivot at its end extending beyond the wide opening of said tines] *torsion member*;

(g) a pair of masses, each being secured to the free end of one of said tines, said tines having large fundamental and small harmonic thrust components, [and] said pair of masses being each disposed with the center of mass offset from the axis of the associated tine[,] whereby the centers of each mass move in arcs having substantially no thrust component;

(h) means [including a first pair of electrodes secured to said tines] for driving said *fork to cause said* tines *to vibrate* substantially at their resonant frequency [determined by said pair of masses, said tines and said base]; and (i) [a second pair of electrodes secured] *means coupled* to said [pivot] *torsion member* for picking up an output signal representative of torsion which produces a shear strain resulting in an amplitude variation of [the] *an* electric field.

2. A system as defined in claim 1 wherein said reaction mass has substantially the same moment of inertia as do said masses, said base and said tines, combined.

3. A system as defined in claim 1 wherein said water is of a Z-cut quartz plate and the angle between said tines is substantially 60 degrees.

4. A system as defined in claim 3 wherein said [second pair of electrodes] *means coupled to said torsion member* picks up a reciprocating change of amplitude proportional to the torsional strain and hence to the Coriolis torque acting on said system.

5. A system as defined in claim 1 wherein said [bridges have] *bridge means has* a flexural and torsional stiffness which is small compared to that of said tines and of said [pivot] *torsion member.*

6. A vibratory angular rate sensing system comprising:

(a) a wafer of crystalline quartz having piezoelectric properties and forming a substantially rectangular mounting frame having a substantially rectangular central opening;

(b) a first group of two pairs of tines, each pair of tines forming the same predetermined angle between each other as does the other pair, to provide substantially a configuration of a first cross;

(c) a second group of two pairs of tines arranged in the form of a cross and substantially like said first group and with substantially the same angles between each pair of tines of said second group, said two groups being disposed within said opening of said frame and along the long sides of said mounting frame;

(d) a first two pairs of masses, each being secured to the free ends of said tines of said first group and a second two pairs of masses, each being secured to the free ends of said tines of said second group, said masses being each disposed with the center of mass offset from the axis of the associated tine;

(e) a pivot passing through the axis of symmetry of said tines and passing through the centers of said groups;

(f) a pair of suspension bridges, each extending between said frame and supporting one group of tines at the center thereof and passing through an associated one of said group of tines;

(g) means including two pairs of electrodes secured to said groups of tines for driving each pair of tines of a group out of phase with respect to each other; and (h) means including a further pair of electrodes for picking up an output signal from said pivot.

7. A system as defined in claim 6 wherein said wafer is of a Z-cut quartz plate and the angle between said pairs of tines is substantially 60 degrees.

8. A system as defined in claim 6 wherein said means for driving generates a wave at a frequency substantially equal to the resonant frequency determined by said masses and said tines, the wave applied to said first group of tines being out of phase with respect to that applied to said second group of tines, whereby the thrust component on said two pairs of tines of each group are equal and opposite, thereby substantially cancelling any force which might otherwise react on said frame.

9. A system as defined in claim 6 wherein said bridges have a flexural and torsional stiffness which is small compared to that of said tines and of said pivot.

*10. In a vibratory angular rate sensing system, a wafer of crystalline quartz having piezoelectric properties and providing a mounting, a fork having a pair of tines extending at a predetermined acute angle from an origin about an axis of symmetry and having a base interconnecting the pair of tines near their origin, means for forming a bridge supporting and isolating said fork on said mounting, a torsion member extending along the axis of symmetry of said fork and being secured to the bridge means, a reaction mass secured to said torsion member, means for driving said fork to cause said tines to vibrate substantially at their resonant frequency and sensing means isolated from the mounting for sensing the vibratory motion of the reaction mass to provide a measure of the input rate about the axis of symmetry of said fork.*

*11. A system as in claim 10 wherein said sensing means is isolated from the mounting by the bridge means.*

*12. In a vibratory angular rate sensing system, a support structure, a driven fork lying in a plane and having an axis of symmetry, said driven fork having first and second tines having at least their outer extremities spaced apart, a torsion member having first and second ends with the first end being secured to the fork and with the torsion member extending between the first and second tines, a mass secured to the second end of torsion member, said driven fork, said torsion member and said mass forming a single unitary rotatable structure to effect an interdependency between the driven fork, the torsion member and the mass, connecting means connecting said rotatable structure to said support structure, means coupling energy into said driven fork to cause vibratory motion of the tines of the said driven fork in the plane of said driven fork, said connecting means including means for isolating said rotatable structure from said support structure so that minimal disturbance is transferred from the support structure to said rotatable structure, and pickoff means mounted on the torsion member and being substantially independent of vibratory motion of the support structure for sensing torsional oscillatory motion with respect to the driven fork to provide a measure of the input angular rate to the support structure about said axis of symmetry of said driven fork so that vibratory motion of the support structure is of minimal significance in the measurement of the input angular rate.*

*13. A system as in claim 12 wherein said connecting means is in the form of bridges.*

*14. A system as in claim 12 wherein said torsion member extends along the axis of symmetry.*

*15. A system as in claim 12 together with an additional mass carried by the free end of each of the tines of the driven fork.*

*16. A system as in claim 12 wherein said tines of said driven fork extend at an acute angle with respect to each other.*

*17. A system as in claim 14 wherein said connecting means is secured to said rotational structure at two spaced apart points.*

*18. A system as in claim 17 wherein said connecting means is in the form of first and second bridge members.*

*19. A system as in claim 18 wherein the mass secured to the torsion member is beyond the outer extremities of the tines of the driven fork.*

*20. A system as in claim 12 wherein said support structure, said connecting means and said rotatable structure are formed of a piezoelectric material.*

*21. In a method for sensing angular rate by the use of a support structure and a single unitary rotatable structure connected to the support structure with the rotatable structure comprising a driven fork having a major axis of symmetry, a torsion member, the steps of substantially isolating the rotatable structure from the support structure so that minimal disturbance is transferred from the support structure to the rotatable structure with respect to relative motion between the support structure and the rotatable structure, supplying energy to the driven fork to cause vibratory motion of the driven fork in a plane of the driven fork and sensing on the torsion member the torsional oscillatory motion of the torsion member with respect to the driven fork with minimal input from the vibratory motion of the support structure to provide a measure of the input angular rate about the major axis of symmetry of the driven fork.*

* * * * *